(12) United States Patent
Madnani et al.

(10) Patent No.: US 8,954,522 B1
(45) Date of Patent: Feb. 10, 2015

(54) HORIZONTAL SCALING THROUGH UPPER LEVEL PROTOCOL PRE-PROCESSING

(75) Inventors: Kiran P. Madnani, Framingham, MA (US); Roy Clark, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 1204 days.

(21) Appl. No.: 11/834,904

(22) Filed: Aug. 7, 2007

(51) Int. Cl.
*G06F 15/167* (2006.01)

(52) U.S. Cl.
USPC .......................................... 709/212

(58) Field of Classification Search
CPC ............ H04L 67/2823; H04L 67/2876; H04L 63/0227; H04L 67/1031; G06F 17/3056
USPC ................................. 709/212, 250
See application file for complete search history.

(56) References Cited

U.S. PATENT DOCUMENTS

| | | | |
|---|---|---|---|
| 6,609,159 B1 * | 8/2003 | Dukach et al. | 719/331 |
| 6,732,117 B1 * | 5/2004 | Chilton | 707/103 X |
| 7,478,221 B1 * | 1/2009 | Karr et al. | 711/203 |
| 7,599,941 B2 * | 10/2009 | Bahar et al. | 1/1 |
| 2002/0078174 A1 * | 6/2002 | Sim et al. | 709/219 |
| 2003/0172145 A1 * | 9/2003 | Nguyen | 709/223 |
| 2012/0290642 A1 * | 11/2012 | Shaughnessy et al. | 709/203 |

OTHER PUBLICATIONS

Pierre Lombard et al., nfsp: A Distributed NFS Server for Clusters of Workstations, 2002, International Parallel and Distributed Processing Symposium, 2002, pp. 1-6.*

* cited by examiner

*Primary Examiner* — Esther Benoit
(74) *Attorney, Agent, or Firm* — Schmeiser, Olsen & Watts LLP

(57) ABSTRACT

An upper level protocol processing mechanism is employed with high performance offload processors to increase system performance while amortizing the cost of employing such processors. Such an upper level protocol processing mechanism can be employed to offload, for example, storage access protocols. An example system might have one or more clients and one or more servers each coupled to its respective storage. One or more front end processors is coupled between the clients and the servers. The clients access the storage coupled to the servers via a storage access protocol. In accordance with the invention, the storage access protocol is divided into a front end protocol portion and a back end protocol portion. The front end protocol portion is executed on the front end processors, while the back end protocol portion is executed on the servers. The back end protocol portion is transparent to the clients.

20 Claims, 14 Drawing Sheets

HORIZONTAL SCALING THROUGH UPPER LEVEL PROTOCOL PRE-PROCESSING

FIELD OF THE INVENTION

The invention relates generally to protocol processing, and particularly to use of high performance offload engines in protocol preprocessing.

BACKGROUND OF THE INVENTION

Networked file storage capacities are growing at an exponential rate. In order to support this growing capacity and the growing demand, faster network infrastructures and horizontally scaled file serving approaches are being deployed. In order to support the increased networking speeds, TCP/IP offload engines (TOEs) are often being deployed to offload the CPU intensive task of TCP/IP session management and associated data flow. TOEs are powerful processors capable of adding substantially to the performance of the respective machine in which they are employed; however, they are very expensive. It would be advantageous to use the high performance capabilities of these offload engines in new ways to further increase system performance while amortizing the cost of employing such processors over the cost of the system.

SUMMARY OF THE INVENTION

In accordance with the invention, there is provided an upper level protocol processing mechanism that is advantageously employed with high performance offload processors to increase system performance while amortizing the cost of employing such processors. Such an upper level protocol processing mechanism can be employed to offload, for example, storage access protocols. An example system might have one or more clients and one or more servers each coupled to its respective storage. One or more front end processors (e.g. TOEs) is coupled between the clients and the servers. The clients access the storage coupled to the servers via a storage access protocol. In accordance with the invention, the storage access protocol is divided into a front end protocol portion and a back end protocol portion. The front end protocol portion is executed on the front end processors, while the back end protocol portion is executed on the servers. The back end protocol portion is transparent to the clients.

One storage access protocol that can be split into a front end protocol portion and a back end protocol portion is NFS. For instance, during initialization, the back end protocol portions send file server identification information their respective export tables to the front end protocol portions. When a client makes a mounted request to access storage coupled to a file server, the front end protocol portion on a front end processor obtains a file handle for the requested storage from the respective file server and stores it at the front end processor for use in servicing later requests. When a client makes a subsequent request to access the storage coupled to the file server, the front end protocol portion processes all metadata associated with the client request; routes the raw request to the file server associated with the storage; and encodes the reply from the file server and sends the encoded reply to the client. Thus, by splitting NFS into a front end protocol portion and back end protocol portion, the file servers deal only with raw read and write requests, thereby allowing them to process a greater number of requests.

The front end processors may be offload processors such as TOEs. The invention herein uses such processors not just for network layer pre-processing but also for upper layer protocol pre-processing, not limited to storage access protocol pre-processing. By moving more pre-processing work onto the offload engines, and by centralizing the offload engines such that each server need not employ its own offload engine, both performance increases and cost amortization are realized.

DETAILED DESCRIPTION OF EXEMPLARY EMBODIMENTS

Figure 1:
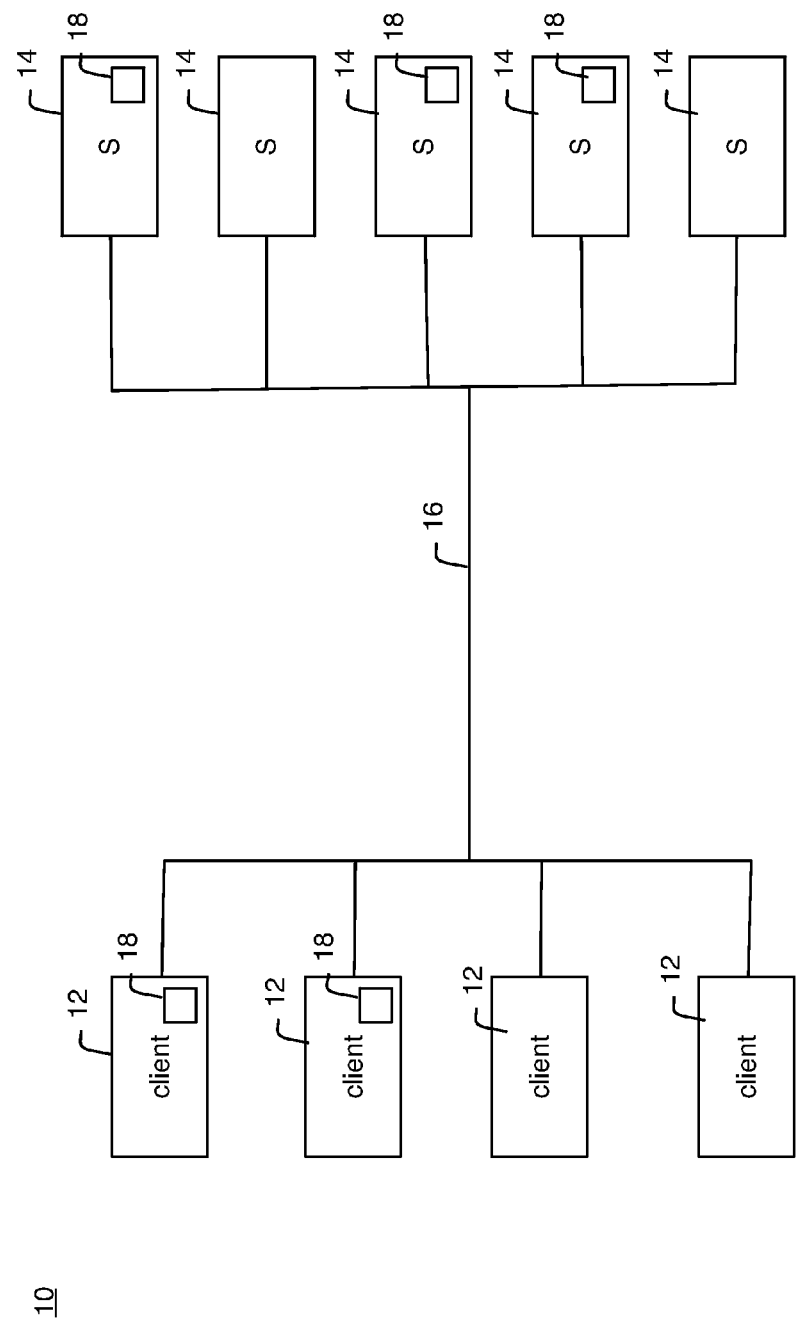
FIG. 1 is a schematic diagram of a network client server computing system.

In FIG. 1 there is shown a prior art networked computing system 10 including client computer systems 12 and servers 14 interconnected via a network 16. The network 16 is shown in a generalized manner and, at the physical level, may be a shared network such as an Ethernet or token ring, or a shared fabric such as infiniband, and may employ network or fabric switches in a point-to-point architecture. Over time, interconnect speeds over the network 16 have become very fast, to the point where specialized computing devices 18 have been implemented on the clients 12 and servers 14 in order to offload the processing of network traffic from their primary CPUs (not shown). One such specialized computing device is a TCP/IP offload engine, or "TOE".

Figure 2:
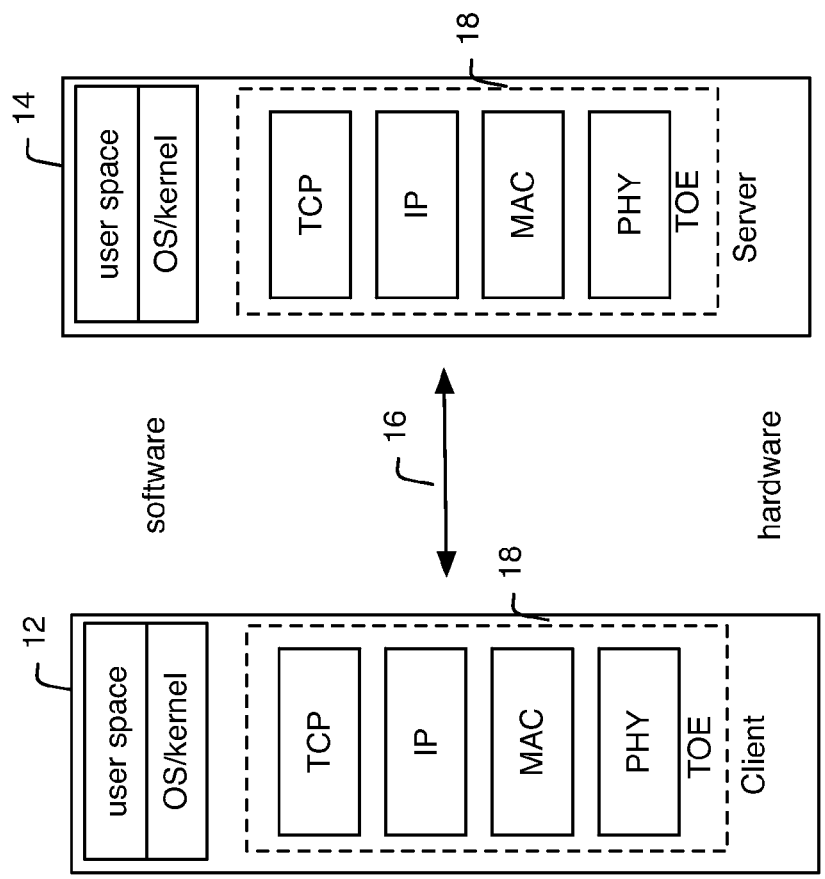
FIG. 2 is a schematic diagram of a networked client and server each implementing TCP/IP offload engines in accordance with the prior art.

An example of a client 12 and server 14 each implementing a TOE 18 in the traditional manner is shown in FIG. 2. Most current networked systems communicate at the network and transport levels (OSI layers 3 and 4) via the TCP/IP protocol. At today's network speeds, the overhead of servicing the TCP and IP portions of this protocol is a significant burden to a client or server OS. The TOE 18 is hardware adapted to offload the OS from processing the TCP and IP layers of the network traffic. So, the TOE 18 is shown herein as responsible for processing the PHY, MAC, IP, and TCP layers of network traffic before forwarding that traffic to the OS. TOEs are powerful processors capable of adding substantially to the performance of the respective machine in which they are employed; however, they add cost to the system.

The invention recognizes that powerful offload processors such as TOEs are capable not only of transport and network offload functionality (i.e. OSI layers 1-4) but also can be used to offload some higher level protocol functionality (i.e. layers 4-7), thereby even further increasing the performance of the computing devices they service. The invention further recognizes that the offload functionality can be architected to serve several computing devices. These aspects of the invention work to amortize the cost of employing these high performance processors in high speed networked systems.

Figure 3:
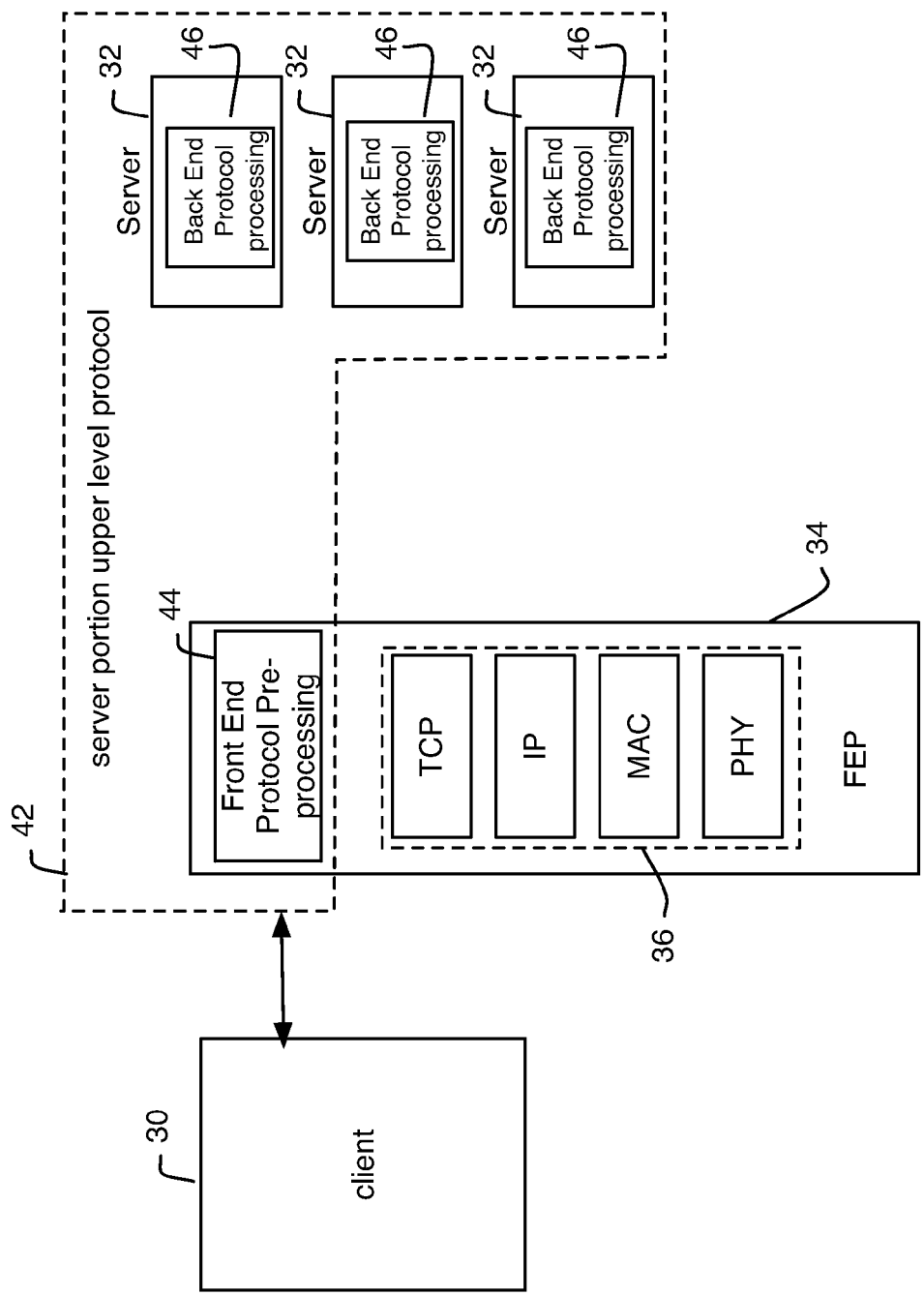
FIG. 3 is a schematic diagram of a Front End Processor (FEP) in accordance with the invention, showing the division of an upper layer protocol into a front end protocol portion and a back end protocol portion in accordance with the invention.

In FIG. 3 there is shown an architecture in accordance with the invention. Client 30 and servers 32 are interconnected through a Front End Processor 34, hereinafter referred to as an "FEP". The FEP 34 is an offload engine that performs higher level protocol offload functionality than the typical prior art TOE. The FEP 34 is shown here to offload the typical TCP/IP stack 36, but is also shown to offload some higher level protocol functionality. Furthermore, the FEP 34 is shown servicing multiple servers 32.

There are many upper level protocols by which client and server computing systems communicate—for example, web service transactions such as HTTP and SSL, and file access protocols such as CIFS, NFS, and FTP. These protocols consist of a client portion and a server portion. In accordance with the invention, the server portion is divided into a front end protocol portion and a back end protocol portion. As seen in FIG. 3, the client 30 runs the client portion 40 of an upper level protocol. The server portion 42 of the upper level protocol is divided into a front end protocol portion 44 and a back end protocol portion 46. The FEP 34 is responsible for the pre-processing of the front end protocol portion 44 of the upper level protocol. Each server 32 need process only the back end portion 46 of the upper level protocol 42, thus freeing its OS to process a greater number of requests and thereby raising its performance. Furthermore, in this example, the front end protocol portion 44 and the TOEs the servers 32 might have employed is singly instantiated in the FEP (36), thus its cost is amortized over all the servers 32.

Figure 4:
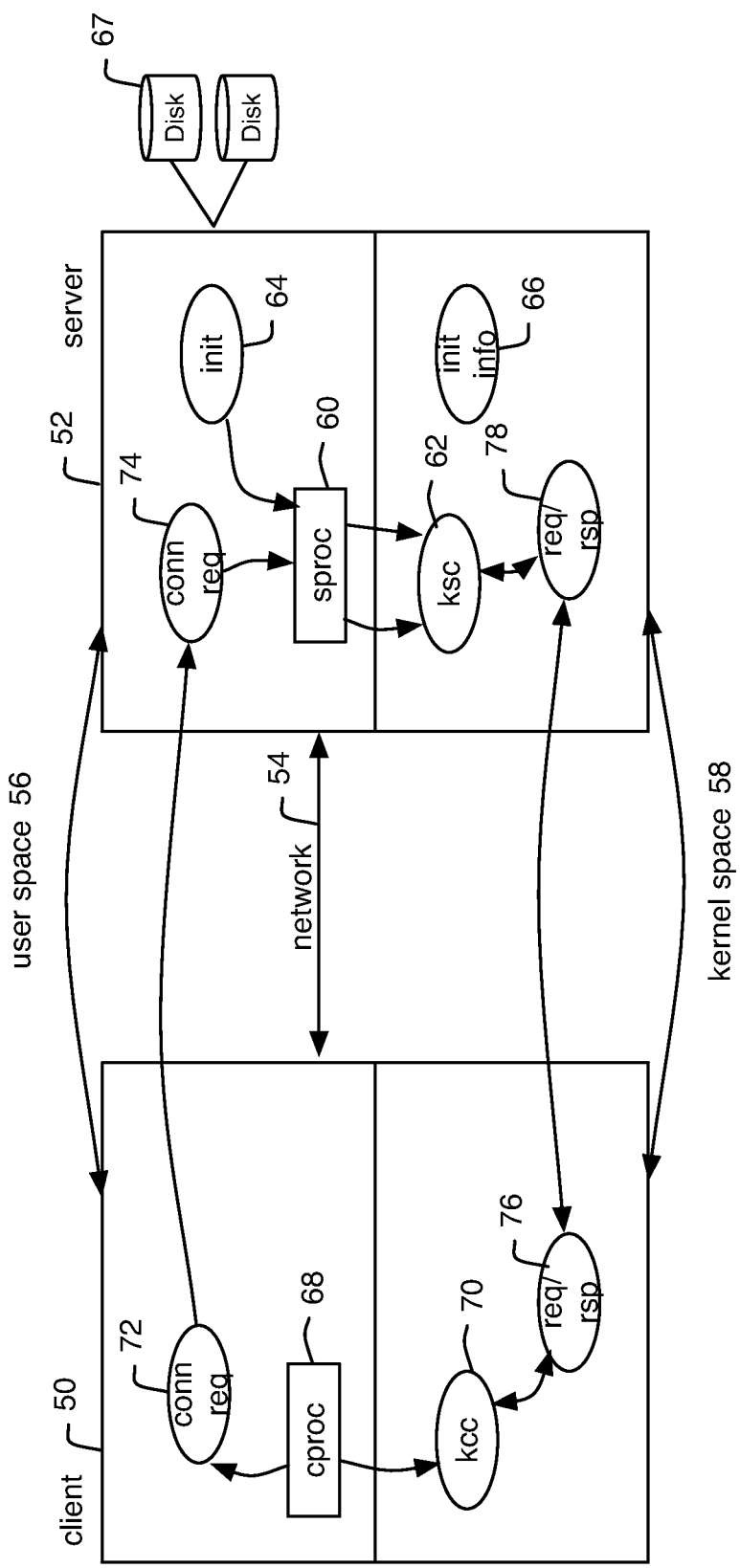
FIG. 4 is a schematic diagram of a generalized remote storage access protocol.

The details of the invention will be further described as they apply to remote storage access protocols. A remote storage access protocol generally allows a client to access storage attached to a remote computer (i.e. a computer accessible via a network) as if the storage were locally attached to the client. Storage access protocols include file access protocols such as CIFS, NFS, FTP, http, https, WEBDAV, SMB, AFP, and block storage access protocols such as iSCSI, FCIP, IFCP. A simplified block diagram of some of the operative parts of a typical prior art remote storage access protocol is shown in FIG. 4. A given storage access protocol might implement one, some, or all of these general processes. A client 50 is shown coupled to a server 52 via a network 54. The user space 56 and kernel space 58 areas are shown on each of the client 50 and server 52 machines. A few basic things (among many other things) that a remote access storage protocol achieves are: an initialization phase, wherein a file or block storage server readies its attached storage for access by remote clients; a connection phase, wherein a client requests access to storage attached to a file or block storage server and the file or block storage server responds to the request; and a session phase, during which client requests and replies to the storage attached to the file or block storage server are handled.

Accordingly, in FIG. 4, the server 52 is shown to have a server process 60 in communication with a kernel server 62. An initialization process 64 communicates through the server process 60 and kernel server 62 to set up initialization information 66 that may be needed in order that the server 52 can offer its attached storage 67 to clients that request access to it. The client 50 is shown to have a client process 68 in communication with a client kernel 70. A connection request process 72 communicates with a corresponding process 74 in the server 52 to request a connection through which the client 50 can access the storage attached to the server 52. If the request is granted, then client process requests will be sent by the client kernel 70 through a request/response process 76 to be serviced by a request/response process 78 managed by the kernel server 62.

In many storage access protocols, the kernel server connection setup and session phase work includes processing of significant metadata, including that related to encoding, authentication, encryption, and more, before raw data requests can be processed—thus, the server portion of the storage access protocol is significantly loaded.

Figure 5:
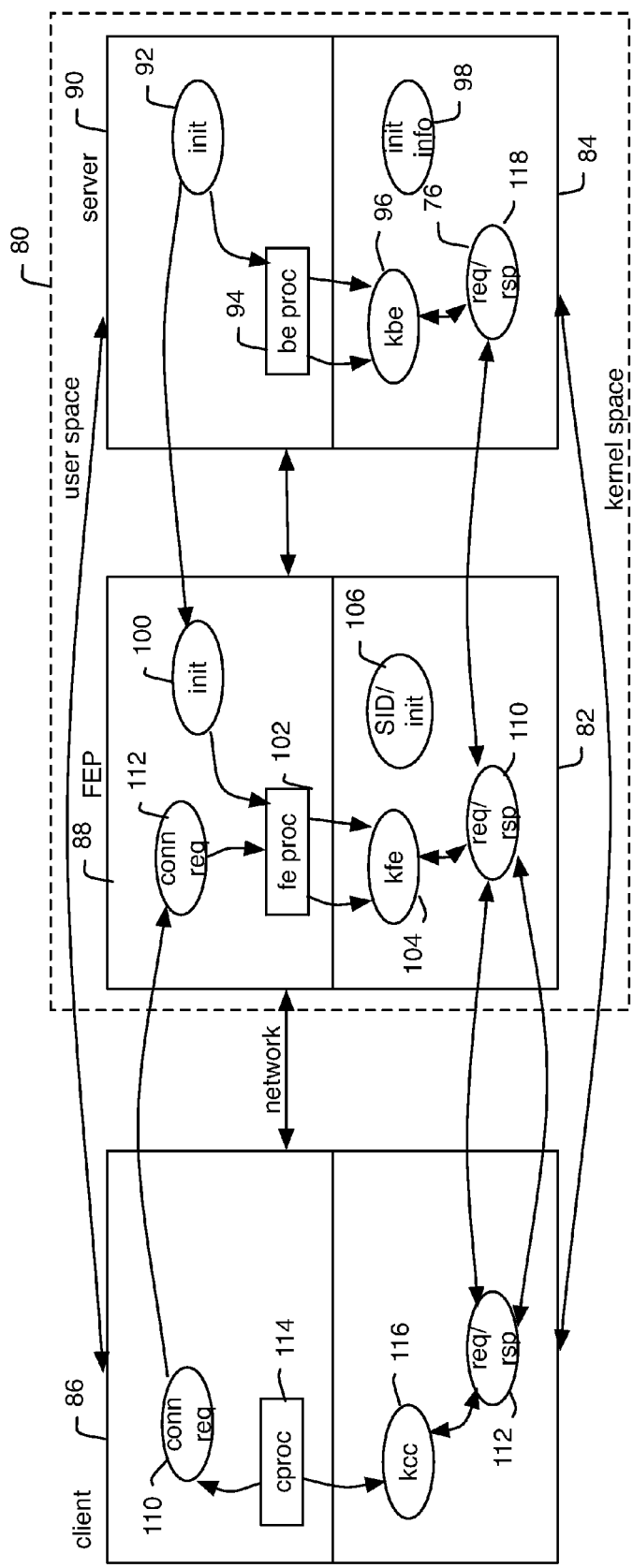
FIG. 5 is a schematic diagram of a generalized remote storage access protocol employing the invention.

Now, shown in FIG. 5 is a block diagram of a remote storage access protocol in accordance with the invention, wherein the server portion 80 of a storage access protocol has been divided into a front end protocol portion 82 and a back end protocol portion 84 as was shown in FIG. 3. Now, the client portion 86 of the storage access protocol communicates with the front end portion 82 of the storage access protocol on the FEP 88. The back end portion of the storage access protocol running on the server 90 is transparent to the client. It is understood that there may be more than one server 90 each running a back end protocol portion 84, but one server 90 is presented for simplification of description.

The initialization, connection, and session phases work in accordance with the invention as follows. During initialization, an initialization process 92 on the back end protocol portion 84 on the server 90 operates by initializing through a back end server process 94 with a back end kernel server 96 and setting up its initialization information 98. Furthermore, the initialization process 92 sends its initialization information 98 to an initialization process 100 within the front end portion 82 on the FEP 88, along with identification information identifying the server 90. The initialization process may send its initialization information 98 and identification information under direction of the back end protocol portion 84, or, the initialization information 98 and identification information may be sent in response to a request from initialization process 100 within the front end portion 82 on the FEP 88. The front end process 102 sends this information to its front end kernel 104, where it is stored (106). The server identification information is used thereafter to index the initialization information for the server associated with it.

In order to establish a connection, the client 86 sends a connection request from its connection process 110. This request is received by a connection process 112 in the front end protocol portion 82 on the FEP 88 and is passed via front end protocol process 102 to the front end kernel 104. Here, the connection request will be evaluated against the stored initialization information 106 and connection granted/denied decision made. If the connection request is granted, the front end protocol portion 82 on the FEP 88 may contact the back end protocol portion 84 on the server 90 for further information to include in a response to the client 86, depending on the protocol—but note to this point the server 90 has not been involved in the connection request. Then a response will be sent by the front end protocol portion 82 back to the client 86 to establish the connection. Note that the client is aware only of communication with the front end portion of the storage access protocol.

Once a connection has been established, the client 86 will from time to time make read or write requests to the storage attached to the server 90. The client 86 will however do so by contacting the FEP 88, since, as far as the client is aware, the storage is attached to the FEP 88. The client 86 process 114 sends a request to the client kernel 116, which in turn invokes a client, kernel request/response process 112. An FEP kernel request/response process 110 communicates with the FEP kernel 104 to process the request. Here, all metadata associated with the client request is processed. Any encoding, authentication, encryption, or other pre-processing of the like is performed at this point. Once all metadata has been processed, a raw read or write request is forwarded to the request/response process 118 on the back end protocol portion 84 on the server 90. The server 90 accesses its attached storage to process the request, and sends a response back to the front end protocol portion 82 on the FEP 88. The front end protocol portion 82 then handles all encoding, encryption, headers, and other processing needed, and the request/response process 110 sends the response back to the client 86.

It can thus be seen that by dividing the storage access protocol into a front end protocol portion and a back end protocol portion, substantial preprocessing of connection requests and session requests and responses is handled by the front end protocol portion. The back end protocol portions are involved only on initialization and raw read/write processing. The OS on each server 90 is thereby substantially offloaded of the overhead processing associated with the storage access protocol.

The invention is now herein described as it is implemented for the storage access protocol Network File System (NFS). NFS is a network protocol that makes files stored on a file server accessible to any computer on a network.

Figure 6:
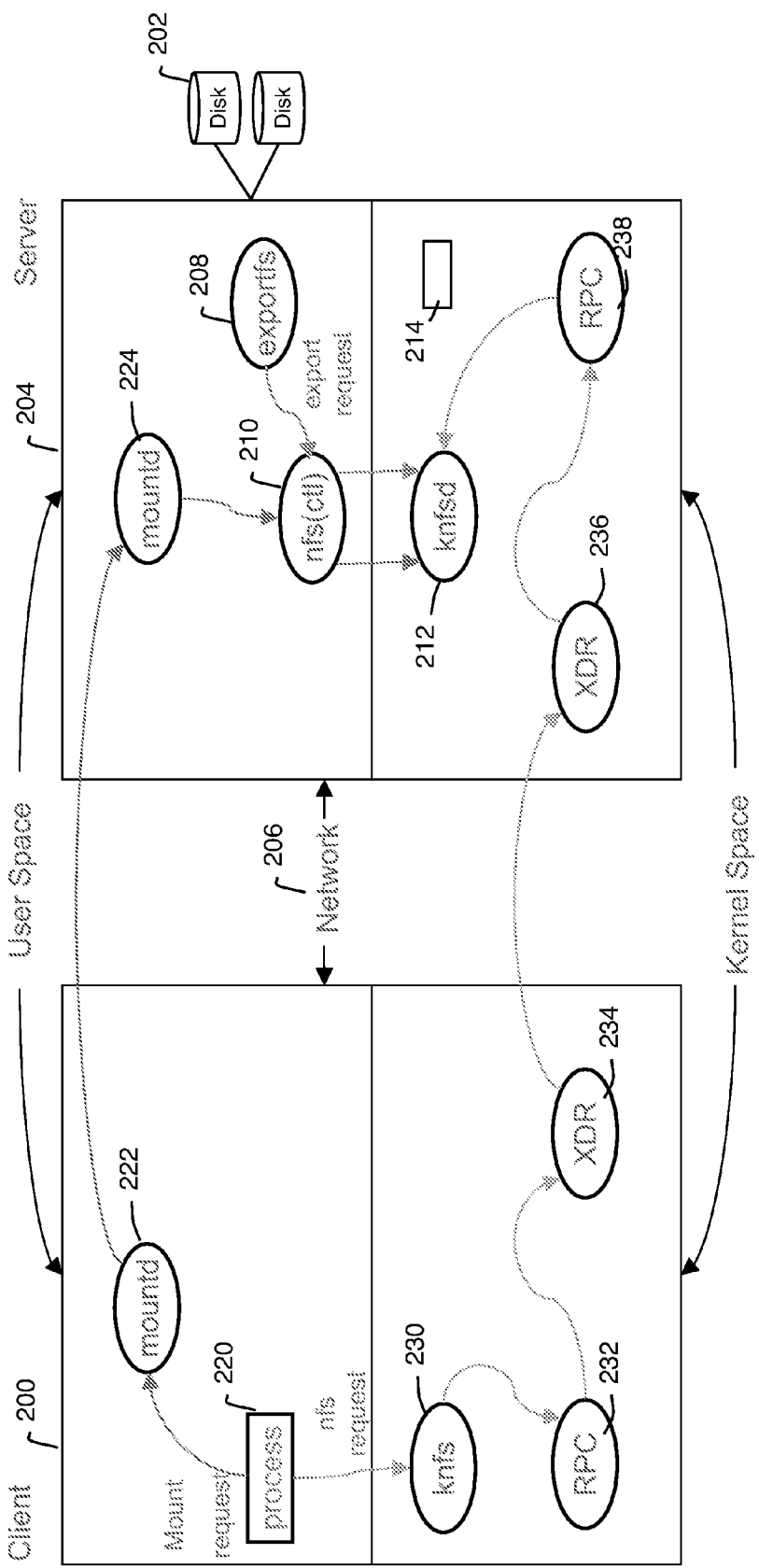
FIG. 6 is a schematic diagram of a prior art NFS system.

A basic prior art implementation of NFS is shown in FIG. 6. A client computer 200 has remote access to storage 202 attached to a file server 204 (FS) via the network 206. NFS v3 is completely specified in Network Working Group RFC 1813, June 1995, "NFS Version 3 Protocol Specification", incorporated by reference herein. Some of the key components of NFS v3 are as follows:

XDR (external Data Representation) —designed to simplify data exchange between heterogeneous (big endian/little endian) networked hosts. XDR encodes arbitrary data in a uniform manner to be sent over a network and decodes it to retrieve the original data at the receiving end.

RPC (Remote Procedure Call) —provides a method for calling functions on another host. Most programming languages allow you to call functions locally. RPC (along with XDR) allows doing the same on remote machines.

The Portmapper—The portmapper maps RPC program numbers to the actual port the service runs on. When a RPC program wishes to make its services available to clients, it registers its service with the portmapper—providing the latter the following information—the program number of the service, the version of the service it supports and the transports (TCP, UDP) the service supports. The portmapper provides this information to an RPC client that contacts it. Then the RPC client can contact the service directly. The portmapper uses a port number 111.

XDR, RPC and the portmapper are generic parts of the RPC that NFS uses.

The Mount Daemon—The NFS server implements the mount protocol. It retrieves a list of exported directories (usually specified in /etc/exports—this file describes the directories the NFS server allows the remote clients to access and the policy for the same). NFS clients contact mounted to request initial access to the NFS volume. The mounted daemon on the NFS server checks the list of currently exported volumes against the credentials of the NFS client and responds, either allowing or denying access. If yes, it returns the root file handle (a 32-64 byte identifier for the top-level directory of the exported volume). The client uses this file handle for all future requests/accesses to that respective directory or subdirectories.

The NFS Locking Daemon—In a distributed file-system like NFS, multiple clients may need to lock the same file. The RPC Locking Daemon, rpc.lockd implements the NFS Lock Manager (NLM) protocol to achieve the above; rpc.lockd uses rpc.statd, which maintains the status of locks.

The NFS Status Daemon—The Network Status Manager (NSM) is used to maintain the state of the locks used by rpc.lockd; rpc.statd is a stateful protocol, that is, it maintains this information across NFS server crashes and reboots.

The NFS Remote Quota Daemon—The rpc.rquotad daemon implements the RQUOTA protocol—this protocol is used to display information about users.

The NFS I/O Daemon—Since the NFS server is stateless, there could be a loss of data in case of a crash. Thus, when the NFS client writes data to the server, the server must write it to stable storage immediately. Synchronous writes are slow. To overcome this problem, NFS implements rpciod server on the client. This server interfaces with the rest of the kernel and collects write requests to remote servers. In particular, rpciod looks for consecutive writes to a file that can be combined into a larger sequential file. However, this buffered data on the local host may be lost if it crashes.

NFS Client Side Code—The main function of the NFS client component is to translate system call requests into their NFS protocol RPC equivalents and send these messages to the NFS server. The client side also coordinates the local I/O daemon (rpciod), the locking daemon (rpc.lockd) and the status-monitoring daemon (rpc.statd). The NFS Server—The NFS server, nfsd, is the heart of the NFS system. It listens for RPC requests from remote hosts and interprets them according to the NFS protocol. It sends responses back to the clients using RPC. It also communicates with the other components that run on the NFS server: rpc.lockd, rpc.statd and rpciod.

In the traditional NFS system, the server 204 initializes the NFS system through the exportfs process 208. The NFS control process 210 interacts with the kernel server knfsd 212 to set up export tables 214. Exportfs defines the files to be exported, the clients that will have access to them, and their protections, among other things. A client process such as 220 makes a connection request via the NFS mount daemon 222. The NFS server mount daemon 224 processes the request by passing it to the knfsd 212 to check it against the export tables for authentication other credentials, and either allows or denies access. If allowed, it returns the root file handle (a 32-64 byte identifier for the top-level directory of the exported volume) to the client. The client uses this file handle for all future requests/accesses to that respective directory or sub-directories during its session. All further requests to the respective directory or sub-directories from the client process 220 are handled by the NFS client kernel knfs 230, which uses remote procedure call RPC 232 and encoding XDR 234. Requests are decoded on the server side by XDR 236 and RPC 238, then handled by NFS kernel server knfsd 212. There is significant overhead involved with decoding and authentication in the XDR and RPC processes before a raw read or write request can be send up to the NFS control process 210 on the server 204.

Figure 7:
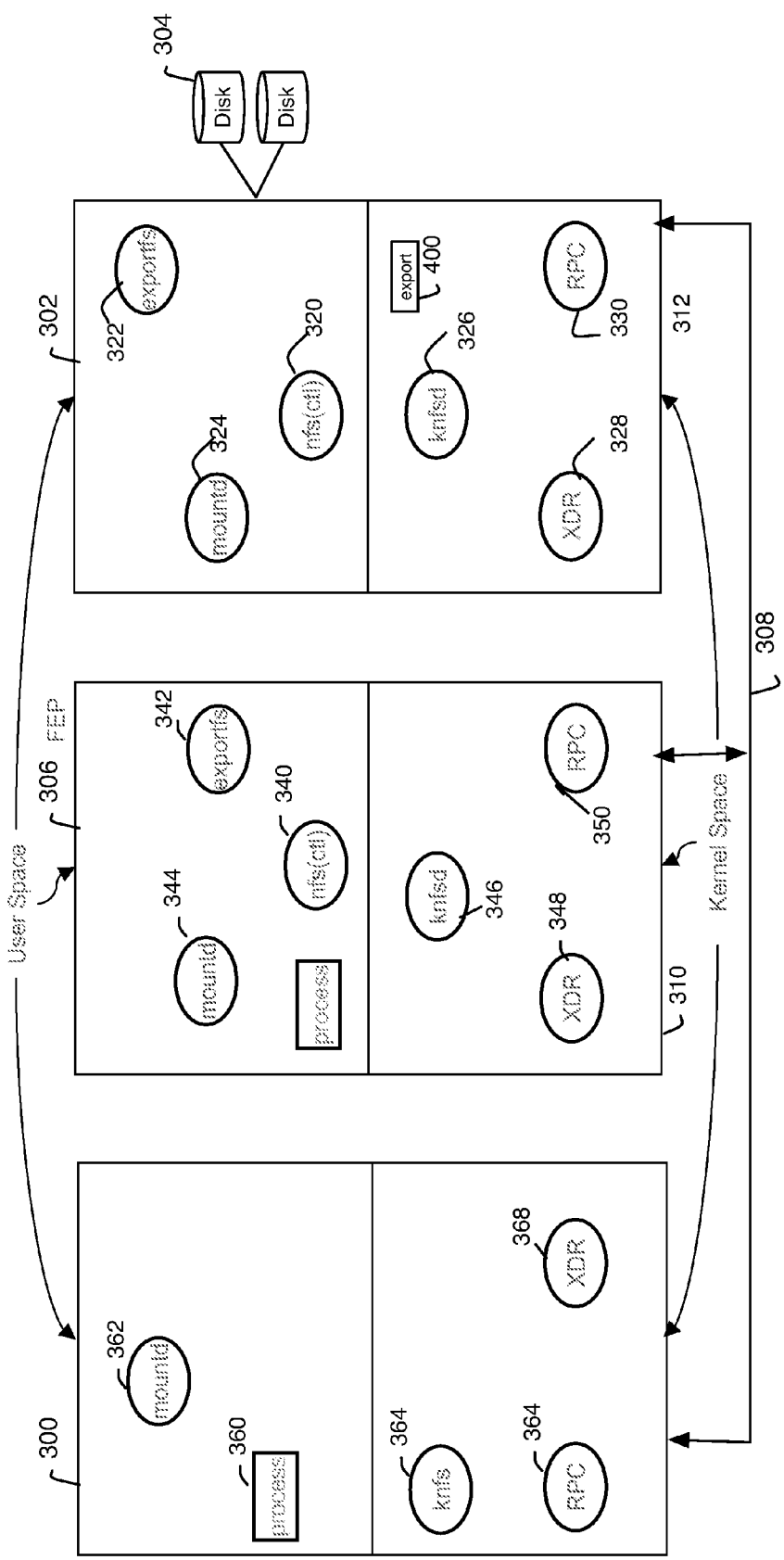
FIG. 7 is a schematic diagram of an NFS system employing the invention.

In FIG. 7 there is shown an NFS system employing the invention. Accordingly, there is shown a client system 300, a file server 302 (FS) with attached storage 304, and a front end processor 306, all in communication via a network 308. The NFS server protocol has been divided into a front end protocol portion 310 and a back end protocol portion 312. One FS 302 is shown, with the understanding that many FS may be coupled to the FEP 306. Each FS implements the NFS server, including the snfs control process 320, exportfs 322, mounted 324, and the nfs kernel server knfsd 326, and the XDR and RPC processes 328 and 330. The FEP also implements the NFS server, including the fepnfs control process 340, exportfs 342, mounted 344, and the nfs kernel server knfsd 346, and the XDR and RPC processes 348 and 350. The client's processes are unchanged, shown as including a client process 360, the mounted daemon 362, the client nfs kernel code 364, and the client RPC and XDR processes 366 and 368.

The basic steps used in offloading upper level processing in NFS are as follows:
Initialization
  FS's send export tables with FS-id.
Connection set-up—i.e. mount request by a client
  Cache file-handle for requested file system—provided by appropriate FS.
Session maintenance—i.e. for each subsequent client request, the FEP does the following:
  Process metadata—e.g. Syntactic check, decoding of headers, and verification of client information on FEP.
  Route raw request to the appropriate FS, who then services the request.
  On receiving the reply from the FS, encode the same and send it to the client that sent the request.

Figure 8:
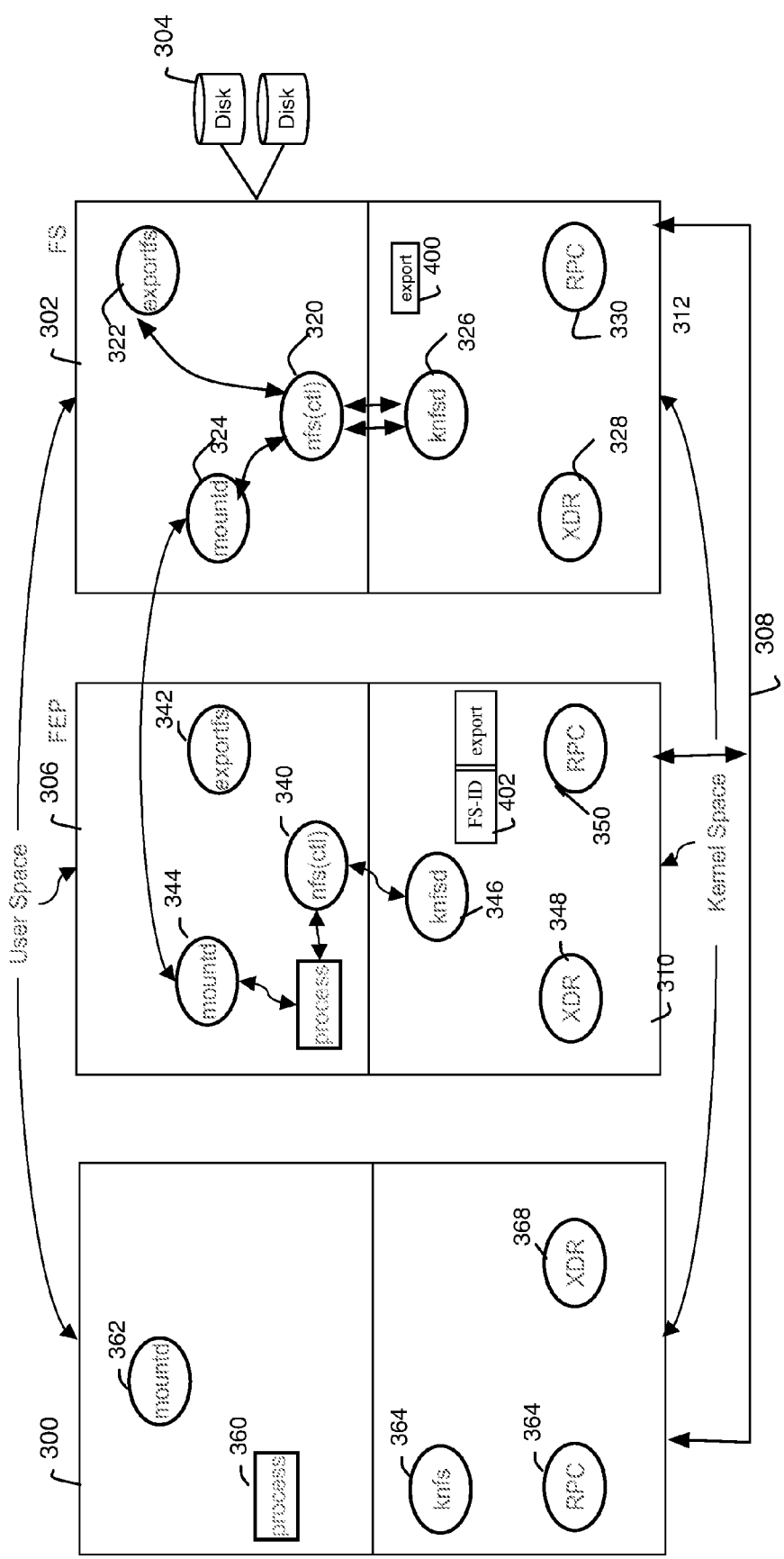
FIG. 8 is a schematic diagram of an NFS system employing the initialization phase of the invention.

In FIG. 8 there is shown the NFS initialization process in accordance with the invention. Each NFS server, for example FS 302, maintains export tables 400 listing their respective storage spaces to be offered for access to clients, for example client 300. During initialization, the FEP 306 invokes its mounted program 344. The mounted program 324 on the back end portion 312 interacts through the nfs control process 320 with the back end kernel server 326 to send its NFS export tables 400 and a server identifier (FS-id) to the FEP 306. The front end NFS protocol portion 310 mounted process 344 forwards the export tables and FS-id through the front end portion nfs control process 340 to the front end kernel server 346, which creates and maintains its own export tables 402. The entries in the export tables 402 are created and maintained based on the FS-id. The FS-id is used thereafter to index the initialization information for the server associated with it. Subsequently, if any of the FS's update their export table—that is, add/delete or modify an export entry, the change is sent to the FEP 306 and the tables 402 are updated. This entire process is transparent to the client 300.

Figure 9:
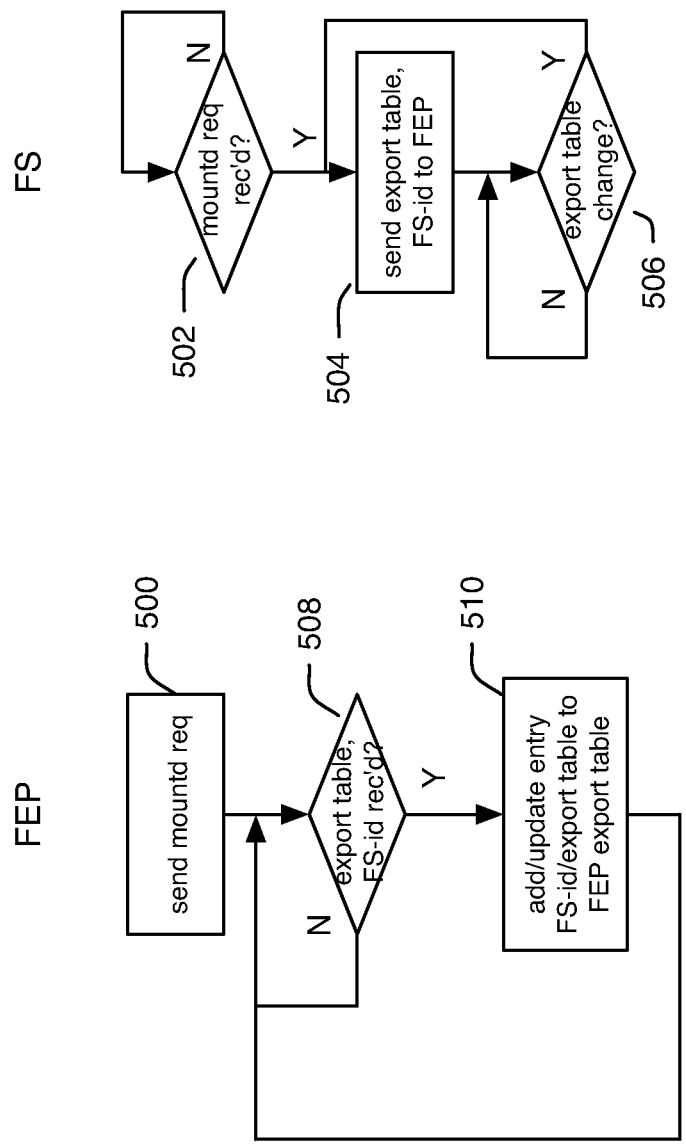
FIG. 9A is a flow diagram of the front end protocol portion of an NFS initialization process in accordance with the invention.
FIG. 9B is a flow diagram of the back end protocol portion of an NFS initialization process in accordance with the invention.

In FIGS. 9A and 9B there are shown flow diagrams of the operation of the front end NFS protocol portion 310 and the back end protocol portion 312 during the initialization process described above. Accordingly, to begin initialization, the front end protocol portion 310 on the FEP 306 sends a mounted request to the back end protocol portion 312 (step 500). Upon receipt of the mounted request (step 502), the back end protocol portion 312 sends its export table and FS-id to the FEP 306 (step 504). Thereafter, any changes or updates to the export table on the FS 302 will be sent to the FEP 306 (step 506). Meanwhile, once the front end protocol portion 310 on the FEP 306 receives the export table and FS-id (step 508), it adds an entry to its export table 402 (step 510), the entry including the export table and the FS-id as an index. If any further export table updates are received (step 508) from this particular FS 302, the export table 402 entry for this FS-id will be updated (step 510).

Figure 10:
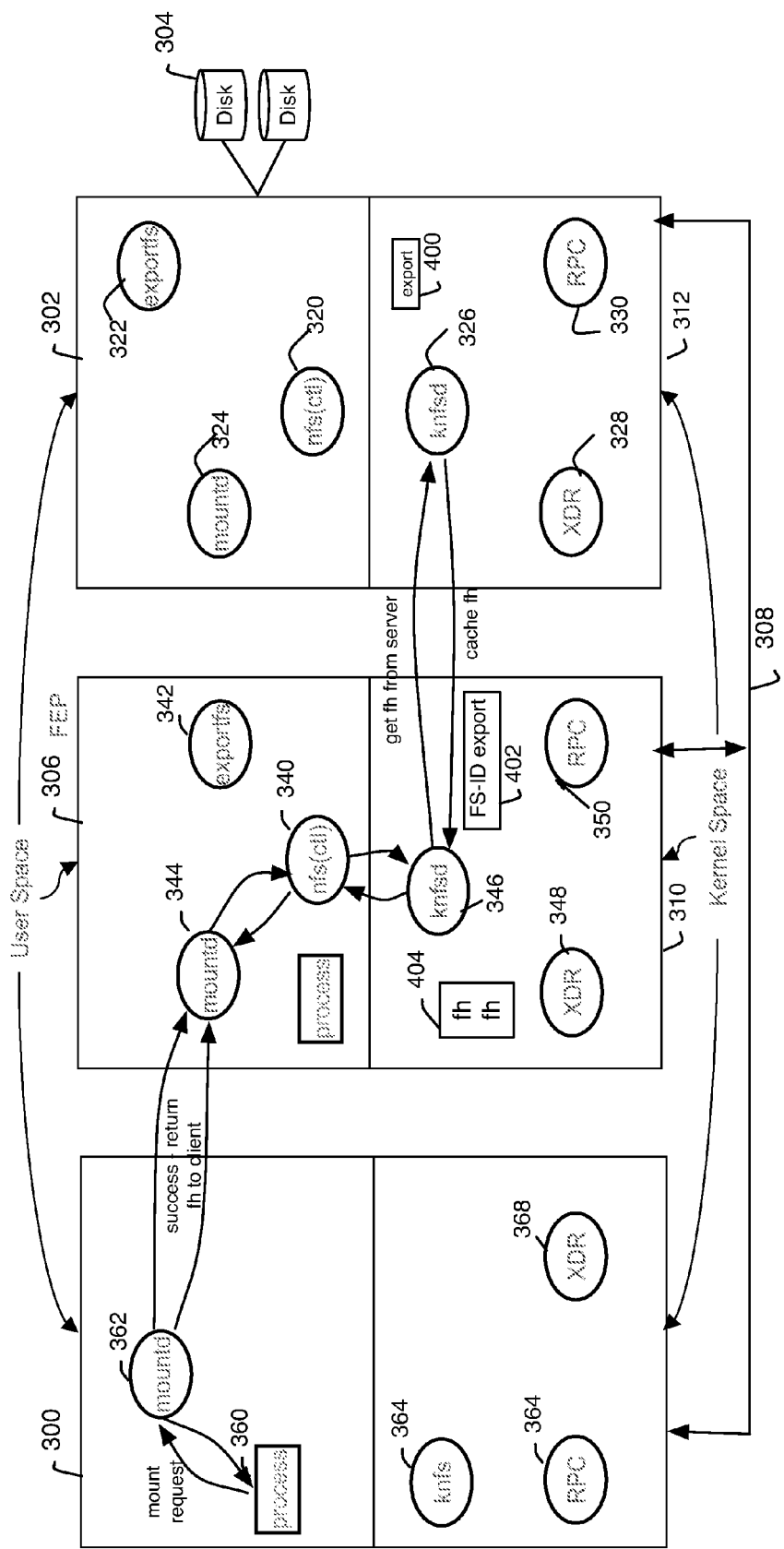
FIG. 10 is a schematic diagram of an NFS system employing the connection phase of the invention.

In FIG. 10 there is shown the NFS connection process in accordance with the invention. In NFS, this is referred to as mounting a file system. In order to mount a file system in accordance with the invention, the client process 360 calls the NFS mounted program 362, which in turn contacts the mounted program 344 running on the front end protocol portion 310 on the FEP 306. The back-end protocol portion 312 and FS 302 are completely transparent to the client 300. On receiving the mount request, the front end protocol portion 310 on the FEP 306 forwards it through the front end portion nfs control process 340 to the front end kernel server 346, where the authenticity of the request is verified against the previously created export table 402 using path identification information in the request to index the export table 402 against the FS-id information in the table. If the request is a valid one, the front end kernel server 346 contacts the back end kernel server 326 on the FS 302 for the file-handle (a 32-64 byte identifier of the root file-system exported). On receiving the file-handle from the back end kernel server 326, the front end kernel server 346 caches it in cache memory 404 for use in routing future requests, and then returns the file-handle to the client 300 via the mounted program.

Figure 11:
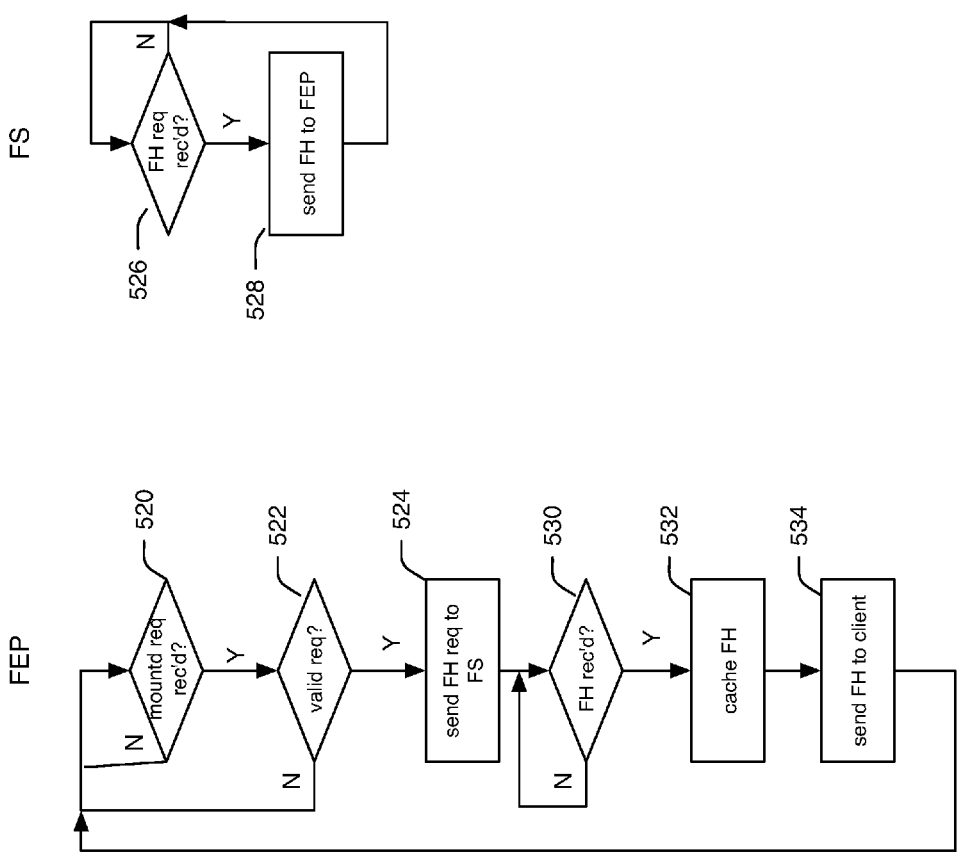
FIG. 11A is a flow diagram of the front end protocol portion of an NFS connection process in accordance with the invention.
FIG. 11B is a flow diagram of the back end protocol portion of an NFS initialization process in accordance with the invention.

In FIGS. 11A and 11B there are shown flow diagrams of the operation of the front end NFS protocol portion 310 and the back end protocol portion 312 during the connection process described above. Accordingly, to set up a connection, the front end protocol portion 310 on the FEP 306 receives a mounted request from a client 300 (step 520). The validity of the request is verified by the front end protocol portion 310 as described above. If the request is determined to be valid (step 522), the front end protocol portion 310 sends a file handle request to the back end protocol portion 312 (step 524). The back end protocol portion 312 receives this request (step 526) and sends the file handle back to the front end protocol portion 310 on the FEP 306 (step 528). Once the front end protocol portion 310 receives the file handle (step 530), it caches the file handle in the cache memory 404 (step 532) and then forwards the file handle back to the client (step 534).

Figure 12:
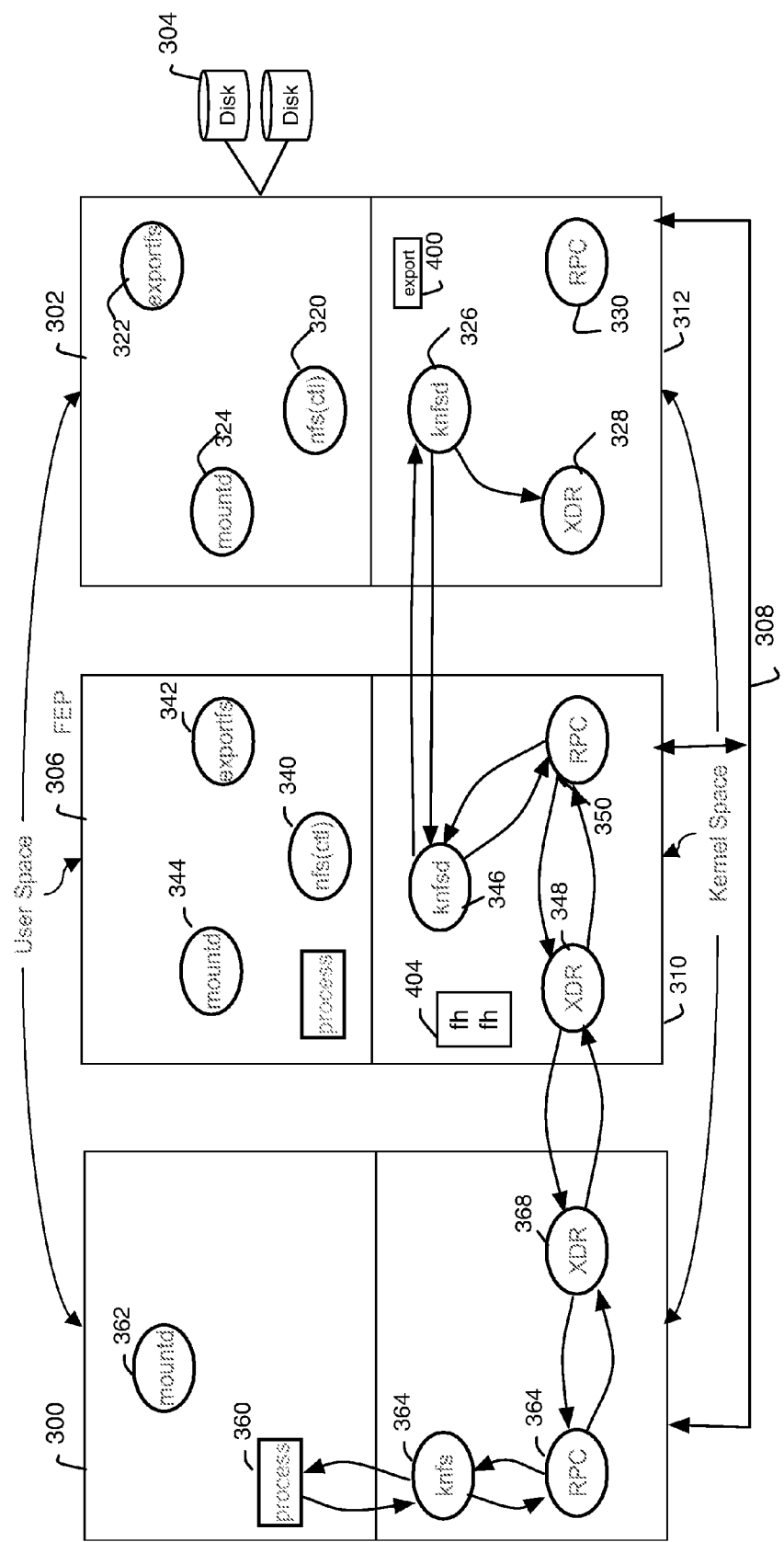
FIG. 12 is a schematic diagram of an NFS system employing the session phase of the invention.

Once a client has successfully mounted a file system, the session portion of the protocol ensues. The client 300 can now issue requests to the file system by calling the NFS client program (knfs) 364. As shown in FIG. 12, the client 300 encodes the request (using XDR 368 and RPC 366 respectively) before sending it to the FEP 308. As mentioned above, the FS 302 that the request is ultimately directed to is transparent to the client 300. The file-handle the client received when it mounted this file-system is also part of this request.

On receiving the request, the front end protocol portion 310 on the FEP 306 handles all metadata processing of the request. The front end protocol portion 310 on the FEP 306 uses its XDR 348 and RPC 350 processes to decode the XDR and RPC portion of the request and authenticate (as part of RPC) the request. It also syntactically verifies the validity of the request and the file-handle. The request is then ready to be routed by the front end kernel server 346 to the back end kernel server 326 on the back end protocol portion 312 on the FS 302. The file-handle (extracted from the request) is used to determine the appropriate FS-id of the FS 302 to which to route the request. On receiving the request, the back end kernel server 326 may invoke the XDR 328 for final decoding of arguments, and then will pass a raw read/write request up to storage (if necessary). Upon successfully servicing the request, the reply is sent back to the front end kernel server 346 on the front end protocol portion 310 on the FEP 306. The front end protocol portion 310 on the FEP 306 in turn encodes the reply via RPC 350 and XDR 348 and sends it out to the client 300.

Figures 13A, 13B:
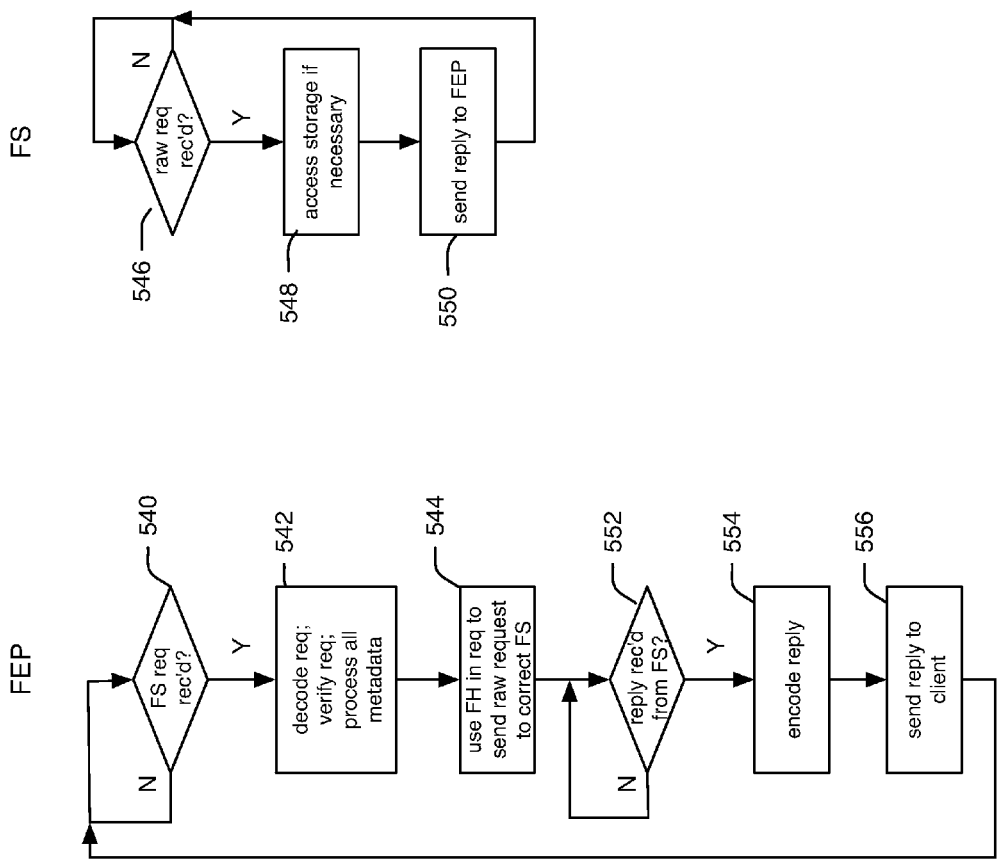
FIG. 13A is a flow diagram of the front end protocol portion of an NFS session process in accordance with the invention.
FIG. 13B is a flow diagram of the back end protocol portion of an NFS session process in accordance with the invention.

In FIGS. 13A and 13B there are shown flow diagrams of the operation of the front end NFS protocol portion 310 and the back end protocol portion 312 during the session process described above. Accordingly, the front end protocol portion 310 on the FEP 306 may receive a file system request from a connected client (step 540). Upon receipt of the request, the front end protocol portion 310 will decode the request, verify it, and pre-process all the metadata associated with the request, in a manner transparent to the FS as described above (step 542). The file handle that was included in the request will be used by the front end protocol portion 310 to select the back end protocol portion 312 on the FS 302 on which to send a raw request (step 544). When the back end protocol portion 312 on the selected FS 302 receives the raw request (step 546), it accesses attached storage if necessary (step 548), and then sends a raw reply back to the front end protocol portion 310 on the FEP 306 (step 550). When the raw reply is received (step 552), the front end protocol portion 310 encodes the reply (step 554) and sends the reply to the client (step 556).

As a result of dividing NFS into a front end protocol portion and a back end protocol portion, at least the following NFS components are pre-processed at the FEP:

XDR decoding and encoding.
RPC programs—rpc.statd, rpc.lockd, rpciod, rquotad
RPC authentication
exportfs
mounted
nfsd—threads,
portmapper
Syntactic check of requests and verification of file handle Each FS thereby gains a proportionate performance advantage, and the cost of the offload engine is amortized across the FS's.

Figure 14:
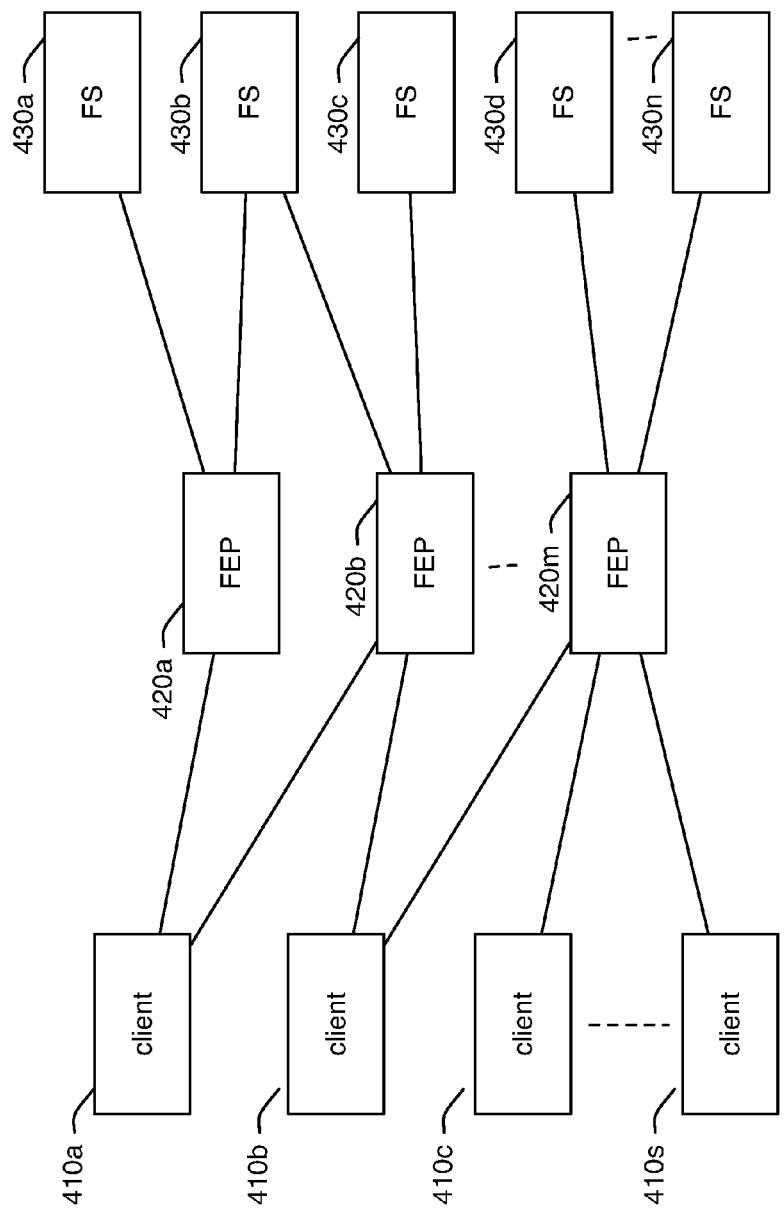
FIG. 14 is a block diagram showing scale-out of m FEPS: n servers.

As so far described, the invention divides the server portion of a high level client server protocol into a front end protocol portion employed on an FEP and back end protocol portions employed on the servers. The invention is scalable such that multiple FEPs can be employed as shown in FIG. 14, where m FEPs service n FS, m<=n. The high level protocol front end pre-processing of the invention is increasingly advantageous as network and other interconnect speeds increase and protocol overhead becomes more burdensome as systems scale out.

Furthermore, as herein shown, the FEP(s) and servers appear to be implemented on separate physical machines; however, they could be implemented on separate processors within the same machine, or on separate cores within the same processor. The interconnection between the FEP(s) and servers may be a physical network, or a channel interconnect, or any other convenient interconnect, or may support RDMA.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Furthermore, many functions described herein may be implemented in hardware or in software. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. A system comprising:
one or more servers each coupled to respective storage memory;
one or more front end processors coupled between the one or more servers and one or more clients, each front end processor performing network layer pre-processing of network traffic directed to the one or more servers;
the one or more clients accessing the storage memory coupled to the one or more servers via a storage access protocol, the storage access protocol consisting of a client program and a server program;
said server program of said storage access protocol being divided into a front end protocol program and a back end protocol program;
said front end protocol program being executed on each front end processor;
said back end protocol program being executed on each server;
said back end protocol program being transparent to said one or more clients, said back end protocol program communicating with said one or more clients via said front end protocol program,
wherein, in response to when a client makes an initial request to access storage memory coupled to a given server of the one or more servers, the front end protocol program executing on a given front end processor of the one or more front end processors obtains an identifier for the requested storage memory from the given server and stores the identifier at the given front end processor, and, in response to when a client makes a subsequent request to access the storage memory coupled to the given server, the front end protocol program executing on a given front end processor processes metadata associated with the subsequent request, routes a raw request to the given server, encodes a reply to the raw request received from the given server, and sends the encoded reply to the client that made the subsequent request.

2. The system of claim 1 wherein during initialization, the back end protocol program executing on each server sends server identification information and storage information to the front end protocol program on each front end processor.

3. The system of claim 2 wherein the storage access protocol is Network File System (NFS), and wherein the back end protocol program executing on each server sends server identification information and storage information by sending its export tables.

4. The system of claim 1 wherein the storage access protocol is Network File System (NFS), and when a client makes a mounted request to access storage memory coupled to the given server, the front end protocol program on the given front end processor obtains a file handle for the requested storage memory from the given server and stores it the file handle at the given front end processor.

5. The system of claim 1 wherein said storage access protocol is Network File System (NFS) and wherein said front end protocol program of the given front end processor performs external Data Representation (XDR) decoding and encoding, Remote Procedure Call (RPC) programs, RPC authentication, exportfs, mounted, sfsd threads, portmapper, syntactic checks of requests, and verification of file handles.

6. Apparatus comprising:
a front end processor coupled between one or more clients and one or more servers, each of the one or more servers coupled to respective storage memory, the front end processor performing network layer pre-processing of network traffic directed to the one or more servers, the one or more clients accessing the storage memory coupled to the one or more servers via a storage access protocol, the storage access protocol consisting of a client program and a server program;
said server program of said storage access protocol being divided into a front end protocol program and a back end protocol program;
said front end processor executing said front end protocol program;
said back end protocol program being executed on each server;
said back end protocol program being transparent to said one or more clients, said back end protocol program communicating with said one or more clients via said front end protocol program,
wherein, in response to when a client makes an initial request to access storage memory coupled to a given server of the one or more servers, the front end protocol program executed by the front end processor obtains an identifier for the requested storage memory from the given server and stores the identifier at the front end processor, and in response to when a client makes a subsequent request to access the storage memory coupled to the given server, the front end protocol program executed by the front end processor processes metadata associated with the subsequent request, routes a raw request to the given server coupled to the storage memory, encodes a reply to the raw request received from the given server, and sends the encoded reply to the client that made the subsequent request.

7. The apparatus of claim 6 wherein during initialization, the front end protocol program on the front end processor receives server identification information and storage information from the back end protocol program on each server.

8. The apparatus of claim 7 wherein the storage access protocol is Network File System (NFS), and wherein the server identification information and storage information received are export tables from the one or more servers.

9. The apparatus of claim 6 wherein the storage access protocol is Network File System (NFS), and when a client makes a mounted request to access storage memory coupled to the given server, the front end protocol program on the front end processor obtains a file handle for the requested storage memory from the given server and stores it at the front end processor.

10. The apparatus of claim 6 wherein said storage access protocol is Network File System (NFS) and wherein said front end protocol program performs external Data Representation (XDR) decoding and encoding, Remote Procedure Call (RPC) programs, RPC authentication, exportfs, mounted, sfsd threads, portmapper, syntactic checks of requests, and verification of file handles.

11. A method comprising the steps of:
coupling a front end processor between one or more clients and one or more servers, each of the one or more servers coupled to respective storage, the clients accessing the storage coupled to the one or more servers via a storage access protocol, said storage access protocol consisting of a client program and a server program, the server program of said storage access protocol being divided into a front end protocol program and a back end protocol program;
performing, by the front end processor, network layer pre-processing of network traffic directed to the one or more servers;
executing said front end protocol program on said front end processor;
executing said back end protocol program on each server;
the execution of said back end protocol program being transparent to said one or more clients, said back end protocol program communicating with said one or more clients via said front end protocol program;
obtaining by the front end protocol program executing on the front end processor, in response to when a client makes an initial request to access storage coupled to a given server, an identifier for the requested storage from the given server and storing the identifier at the front end processor; and
in response to when a client makes a subsequent request to access storage coupled to the given server, processing, by the front end protocol program executing on the front end processor, metadata associated with the client request, routing a raw request to the given server coupled to the storage, encoding a reply to the raw request received from the given server; and sending the encoded reply to the client that made the subsequent request.

12. The method of claim 11 further comprising the step of:
receiving by the front end protocol program on the front end processor server identification information and storage information from the back end protocol program on each server.

13. The method of claim 12 wherein the storage access protocol is Network File System (NFS), and wherein the server identification information and storage information received during the step of receiving are export tables from the one or more servers.

14. The method of claim 11 wherein the storage access protocol is Network File System (NFS), and when a client makes a mounted request to access storage coupled to the given server, the step of obtaining by the front end protocol program on the front end processor obtains a file handle for the requested storage from the given server and stores it at the front end processor.

15. The method of claim 11 wherein said storage access protocol is NFS and wherein said front end protocol program performs external Data Representation (XDR) decoding and encoding, Remote Procedure Call (RPC) programs, RPC authentication, exportfs, mounted, sfsd threads, portmapper, syntactic checks of requests, and verification of file handles.

16. A program product comprising a non-transitory computer readable medium having embodied therein a computer program for storing data, the computer program comprising:
a storage access protocol for use in a system wherein a front end processor is coupled between one or more clients and one or more servers, each of the one or more servers being coupled to respective storage, the front end processor performing network layer pre-processing of network traffic directed to the one or more servers, the one or more clients accessing the storage coupled to the one or more servers via said storage access protocol, the storage access protocol consisting of a client program and a server program;
said server program of said storage access protocol being divided into a front end protocol program and a back end protocol program portion;

said front end protocol program executing on said front end processor;

said back end protocol program executing on each server;

said back end protocol program being transparent to said one or more clients, said back end protocol program communicating with said one or more clients via said front end protocol program, wherein, when a client makes an initial request to access storage coupled to a given server, the front end protocol program executing on the front end processor obtains an identifier for the requested storage from the given server and stores the identifier at the front end processor, and when a client makes a subsequent request to access the storage coupled to the given server, the front end protocol program executing on the front end processor processes metadata associated with the subsequent request, routes a raw request to the given server coupled to the storage, encodes a reply to the raw request received from the given server, and sends the encoded reply to the client that made the subsequent request.

17. The program product of claim 16 having an initialization phase during which the front end protocol program on the front end processor receives server identification information and storage information from the back end protocol program on each server.

18. The program product of claim 17 wherein the storage access protocol is Network File System (NFS), and wherein the server identification information and storage information received are export tables from the one or more servers.

19. The program product of claim 16 wherein the storage access protocol is Network File System (NFS), operable when a client makes a mounted request to access storage coupled to the given server so that the front end protocol program on the front end processor obtains a file handle for the requested storage from the given server and stores it at the front end processor.

20. The program product of claim 16 wherein said storage access protocol is Network File System (NFS) and wherein said front end protocol program performs external Data Representation (XDR) decoding and encoding, Remote Procedure Call (RPC) programs, RPC authentication, exportfs, mounted, sfsd threads, portmapper, syntactic checks of requests, and verification of file handles.

* * * * *